United States Patent
Hansen et al.

(10) Patent No.: US 12,162,604 B2
(45) Date of Patent: Dec. 10, 2024

(54) SEAT PAN MOUNTED MOBILE DEVICE HOLDER

(71) Applicant: AMI Industries, Inc., Colorado Springs, CO (US)

(72) Inventors: Brian C. Hansen, Colorado Springs, CO (US); Alexander C. Turner, Colorado Springs, CO (US); Phillip J. Arellano, Pueblo, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 190 days.

(21) Appl. No.: 17/983,564

(22) Filed: Nov. 9, 2022

(65) Prior Publication Data
US 2024/0150020 A1    May 9, 2024

(51) Int. Cl.
*B64D 11/06* (2006.01)
*H04B 1/3888* (2015.01)
(Continued)

(52) U.S. Cl.
CPC ...... *B64D 11/0636* (2014.12); *B64D 11/0691* (2014.12); *H04B 1/3888* (2013.01);
(Continued)

(58) Field of Classification Search
CPC ............ B64D 11/0629; B64D 11/0631; B64D 11/0633; B64D 11/0015–00154;
(Continued)

(56) References Cited

U.S. PATENT DOCUMENTS

| | | | | | |
|---|---|---|---|---|---|
| 2,517,433 | A | * | 8/1950 | Hoven | G09F 23/00 |
| | | | | | 297/452.1 |
| 2,635,681 | A | * | 4/1953 | Hiltman | B60Q 3/41 |
| | | | | | 297/217.6 |

(Continued)

FOREIGN PATENT DOCUMENTS

| | | |
|---|---|---|
| CN | 113353266 A | 9/2021 |
| EP | 3248875 A1 | 11/2017 |

(Continued)

OTHER PUBLICATIONS

Ipeco, "Double attendant seats", https://www.ipeco.com/products-and-services/aircraft-crew-seating/cabin-attendant/.

(Continued)

*Primary Examiner* — Syed A Islam
(74) *Attorney, Agent, or Firm* — Suiter Swantz IP

(57) ABSTRACT

A cabin attendant seat is disclosed. The seat may include a seat pan and a seatback. The seat may include a device holder coupled to the seat pan. The device holder may include a main body including a plurality of main body walls that define a main body cavity and a cover including a plurality of cover walls that define a cover cavity. The main body cavity and the cover cavity may form a device holder cavity configured to stow a mobile device. The device holder may include an opening configured to receive the mobile device. The device holder may include a device securing assembly configured to rotate between a first and second position, when in the first position the securing assembly configured to secure the mobile device within the cavity, when in the second position the mobile device configured to be removed from the device holder cavity.

14 Claims, 14 Drawing Sheets

(51) Int. Cl.
  *B60N 3/00* (2006.01)
  *B60R 7/04* (2006.01)
  *G09F 1/10* (2006.01)
  *G09F 23/00* (2006.01)

(52) U.S. Cl.
  CPC ............... *B60N 3/00* (2013.01); *B60R 7/043* (2013.01); *G09F 1/10* (2013.01); *G09F 2023/005* (2013.01)

(58) Field of Classification Search
  CPC . B64D 11/0636; B64D 11/0627; B60R 7/043; B30N 3/00; G09F 2023/005; G09F 1/10; G09F 3/20; G09F 7/10
  See application file for complete search history.

(56) References Cited

U.S. PATENT DOCUMENTS

| | | | |
|---|---|---|---|
| 4,799,632 A | 1/1989 | Baymak et al. | |
| 7,252,569 B2* | 8/2007 | Everhart | B64D 11/06 206/769 |
| 7,530,631 B2* | 5/2009 | Skelly | B64D 11/064 297/188.21 |
| 8,540,309 B2* | 9/2013 | Berger | B64D 11/00153 40/594 |
| 8,650,785 B1* | 2/2014 | Logan | G09F 7/10 40/661.03 |
| 8,998,313 B2 | 4/2015 | Reh et al. | |
| 9,327,836 B2 | 5/2016 | Weitzel et al. | |
| 9,421,915 B2 | 8/2016 | Kalergis et al. | |
| 9,457,905 B2 | 10/2016 | Felske et al. | |
| 9,573,688 B2* | 2/2017 | Pozzi | B64D 11/0648 |
| 9,688,408 B2 | 6/2017 | Klettke | |
| 9,908,623 B2 | 3/2018 | Hashberger et al. | |
| 10,494,099 B2* | 12/2019 | Wickham | B64D 11/0631 |
| 10,640,269 B2* | 5/2020 | Lumsden | B65D 55/026 |
| 10,671,848 B2* | 6/2020 | Kumar | G06V 10/95 |
| 10,814,796 B2* | 10/2020 | Barnes | B64D 11/00152 |
| 2007/0152480 A1 | 7/2007 | Muin et al. | |
| 2008/0061606 A1 | 3/2008 | Skelly et al. | |
| 2013/0126672 A1 | 5/2013 | Weitzel et al. | |
| 2014/0125092 A1 | 5/2014 | Schreuder et al. | |
| 2019/0233121 A1* | 8/2019 | Wunderlich | B64D 11/0631 |
| 2019/0291870 A1 | 9/2019 | Hall | |
| 2022/0185484 A1 | 6/2022 | Marutzky | |
| 2022/0234739 A1 | 7/2022 | Morales et al. | |

FOREIGN PATENT DOCUMENTS

| | | |
|---|---|---|
| EP | 3354556 B1 | 8/2018 |
| GB | 2563184 A | 12/2018 |
| JP | 4945562 B2 | 6/2012 |

OTHER PUBLICATIONS

Extended European Search Report dated Mar. 15, 2024; European Application No. 23208857.5.

* cited by examiner

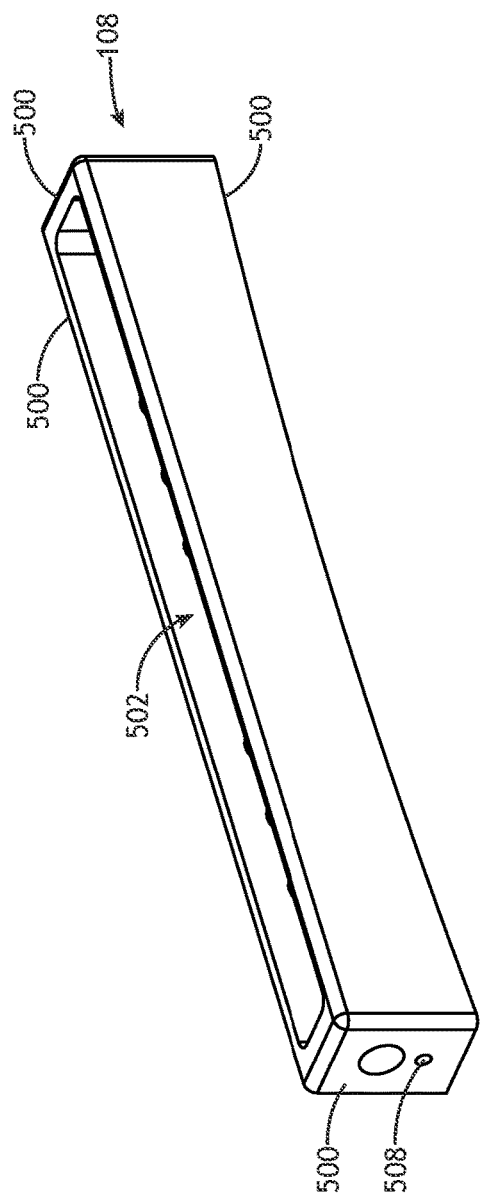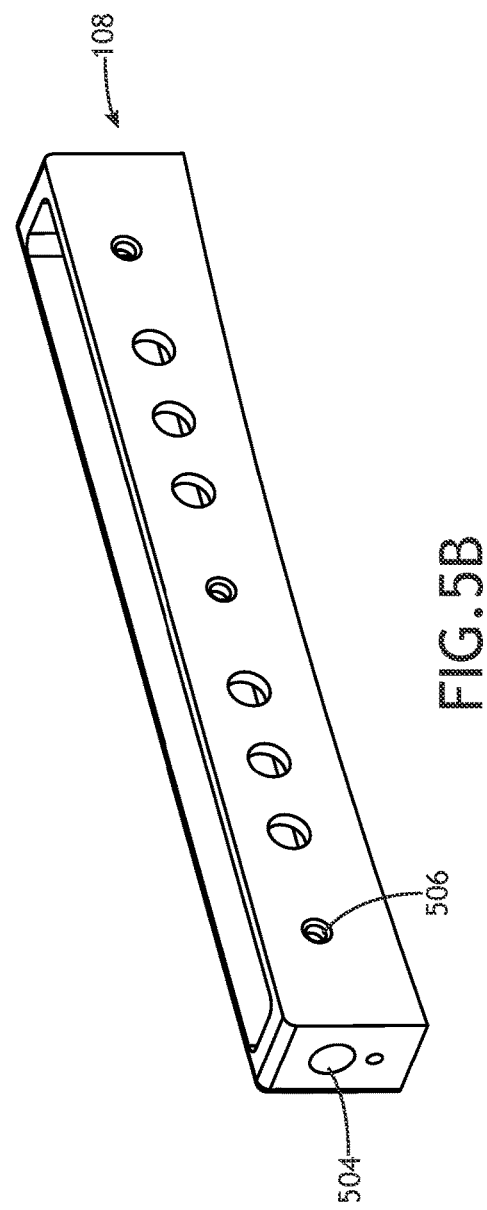

SEAT PAN MOUNTED MOBILE DEVICE HOLDER

BACKGROUND

Aircraft cabin designs include cabin attendant seats for taxi, takeoff, or landing (TTL) situations, turbulence, emergencies, or the like, as aviation guidelines and/or standards dictate that flight attendants be seated at these times. Often, seat occupants have mobile devices that are used during the flight (e.g., pre-flight, in-flight, or post-flight) which need to be stowed when not in use.

SUMMARY

A cabin attendant seat is disclosed, in accordance with one or more embodiments of the present disclosure. The cabin attendant seat includes a seat pan. The cabin attendant seat includes a seatback. The cabin attendant seat includes a device holder coupled to a portion of the seat pan. The device holder includes a main body including a plurality of main body walls that define a main body cavity, a main body wall of the plurality of main body walls configured to couple to the portion of the seat pan. The device holder includes a cover including a plurality of cover walls that define a cover cavity, the main body cavity and the cover cavity forming a device holder cavity configured to stow a mobile device when the cover is coupled to the main body. The device holder includes an opening positioned proximate to the device holder cavity, the opening configured to receive the mobile device. The device holder includes a structural member coupled to an additional main body wall of the plurality of main body walls. The device holder includes a device securing assembly coupled to one of the main body, the cover, or the structural member, the device securing assembly configured to rotate between at least a first position and a second position, when in the first position the device securing assembly configured to secure the mobile device within the cavity, when in the second position the mobile device configured to be removed from the device holder cavity via the opening.

In some embodiment, the device securing assembly may include a retention lever assembly including a handle portion, a lever portion, and a securing portion.

In some embodiments, the retention lever assembly may be coupled to the structural member via the securing portion of the retention lever assembly.

In some embodiments, the lever portion includes a status indicator.

In some embodiments, the retention lever assembly may further include one or more detent holes configured to facilitate positive locking between at least the first position and the second position.

In some embodiments, the structural member may include one or more detent pin holes configured to receive one or more detent pins.

In some embodiments, the main body cavity may include one or more padded portions, the one or more padded portions coupled to at least one main body wall of the plurality of main body walls, the one or more padded portions configured to protect the mobile device when stowed in the device holder cavity.

In some embodiments, the device holder may further include one or more access ports.

In some embodiments, a cover wall of the plurality of cover walls may include one or more raised portions.

In some embodiments, the main body wall of the plurality of main body walls may include one or more perforations.

In some embodiments, the device holder may further include one or more placards coupled to one or more exterior surfaces of the plurality of cover walls of the cover.

In some embodiments, the one or more informational placards may include a maximum weight placard.

In some embodiments, the one or more informational placards may include a device securing assembly instruction placard.

In some embodiments, the cover may be formed of a thermoformed plastic.

In some embodiments, the plurality of cover walls of the cover may be dimensioned to fit over the plurality of main body walls of the main body, one or more interior surfaces of the plurality of cover walls configured to engage with one or exterior surfaces of the plurality of main body walls of the main body.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5A illustrates a perspective view of a structural member of the seat mounted mobile device holder, in accordance with one or more embodiments of the present disclosure.

FIG. 5B illustrates a perspective view of the structural member of the seat mounted mobile device holder, in accordance with one or more embodiments of the present disclosure.

DETAILED DESCRIPTION OF THE INVENTION

Figure 1A:
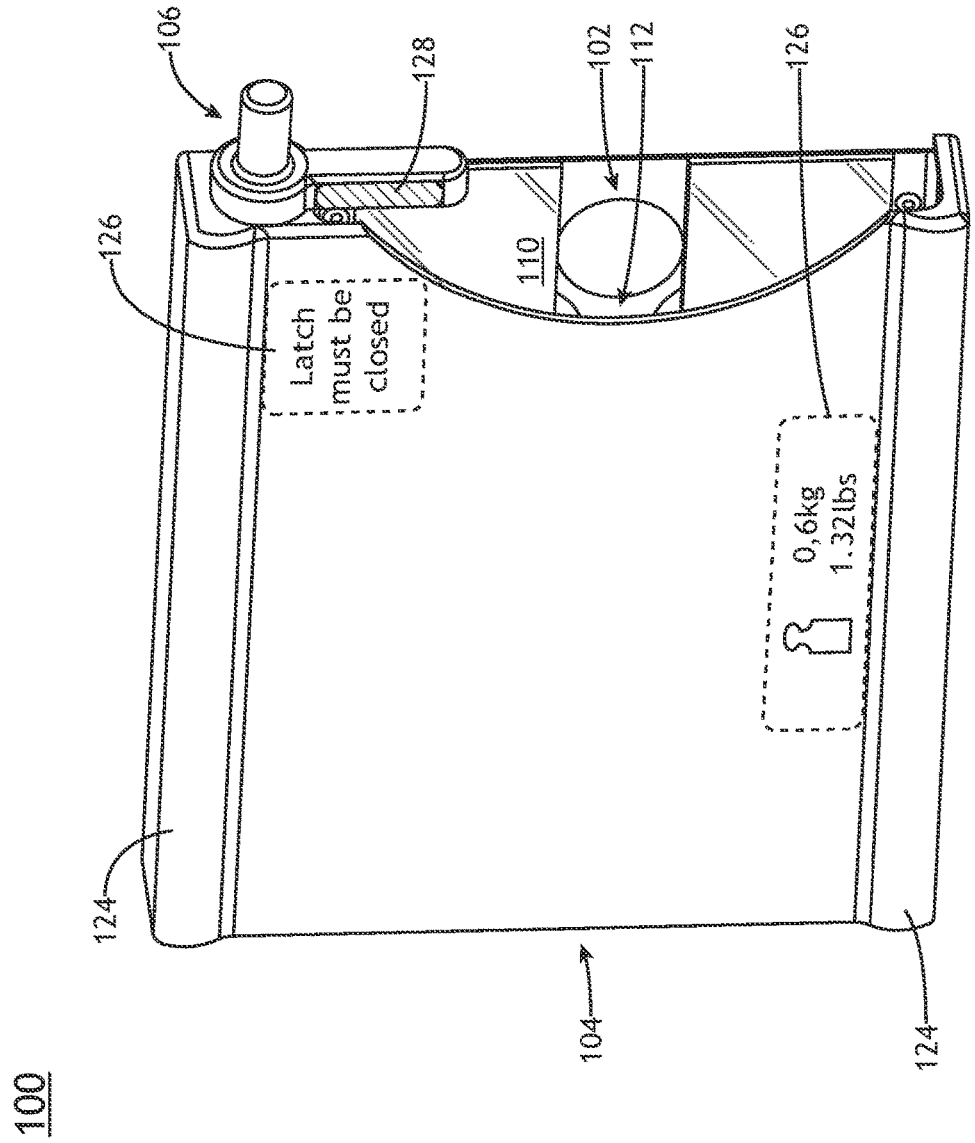
FIG. 1A illustrates a perspective view of a seat pan mounted mobile device holder, in accordance with one or more embodiments of the present disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-6G generally illustrate a seat pan mounted mobile device holder, in accordance with one or more embodiments of the disclosure.

Aircraft cabin designs include cabin attendant seats for taxi, takeoff, or landing (TTL) situations, turbulence, emergencies, or the like, as aviation guidelines and/or standards dictate that flight attendants be seated at these times. Often, crew members (e.g., cabin attendants) have mobile devices that are used during the flight (e.g., pre-flight, in-flight, or post-flight) which need to be stowed when not in use.

As such, it would be desirable to provide a seat mounted device holder. The device holder should allow the seat occupant (e.g., cabin attendant) to be able to access and store the mobile device (e.g., tablet, smartphone, or the like) while seated or standing. The device holder should allow the mobile device to be retained within the device holder regardless of the conditions/state of the aircraft (e.g., aircraft altitude, acceleration rate, high turbulence, TTL situations, emergency crash, and the like). For example, the device holder should be able to withstand accelerations up to 16 G. The device holder should allow the passenger to ingress and egress without interference of the device holder and/or the device contained within the device holder.

Figure 1B:
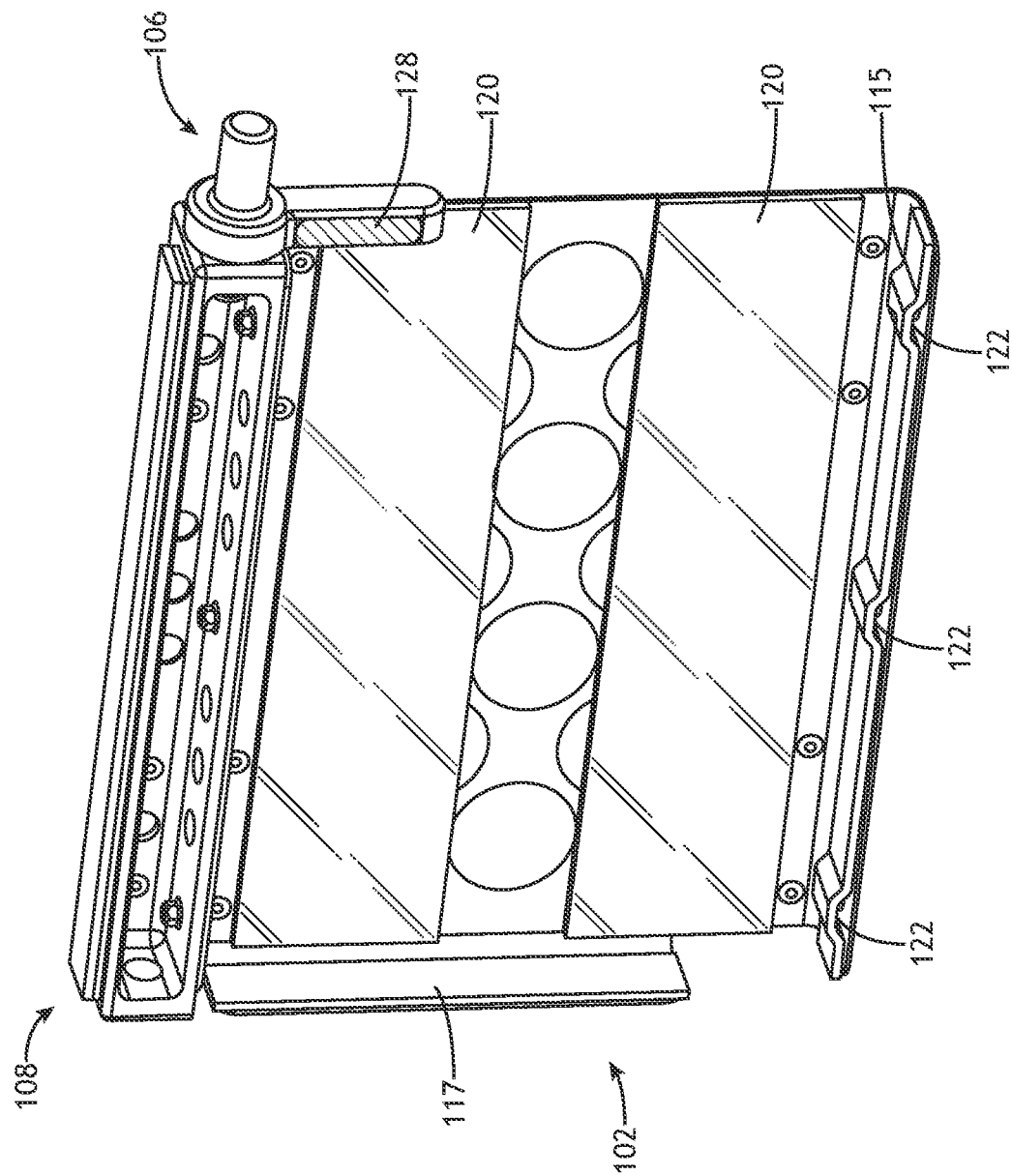
FIG. 1B illustrates a cross-sectional view of the seat pan mounted mobile device holder, in accordance with one or more embodiments of the present disclosure.
Figure 1C:
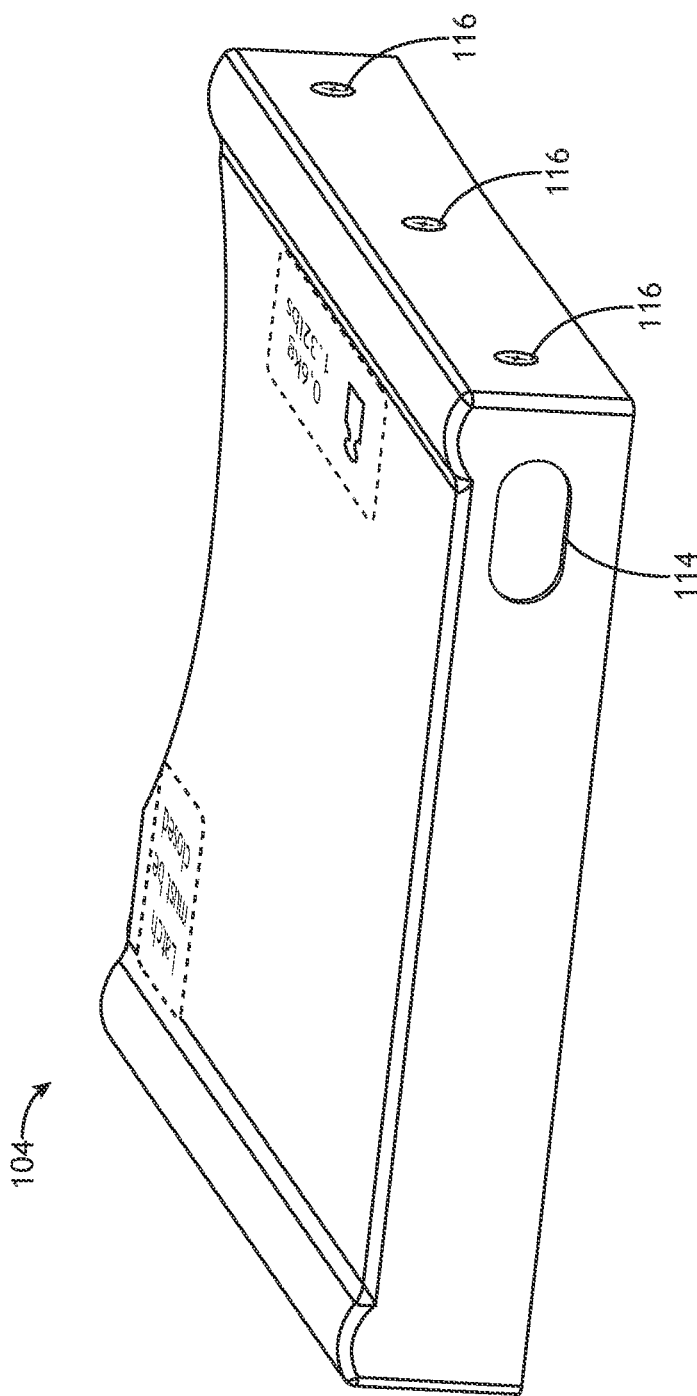
FIG. 1C illustrates a rear perspective view of the seat pan mounted mobile device holder, in accordance with one or more embodiments of the present disclosure.

FIGS. 1A-1C illustrates a seat pan mounted mobile device holder 100, in accordance with one or more embodiments of the present disclosure. For purposes of the present disclosure, it is noted that "seat pan mounted mobile device holder," "seat pan mounted device holder," "mobile device holder," "device holder," and variations thereof may be considered equivalent.

In embodiments, the device holder 100 includes, but is not limited to, a main body 102, a cover 104, a lever assembly 106, a structural member 108, a mobile device cavity 110, an opening 112, and an access port 114.

The cover 104 may be configured to couple to one or more portions of the main body 102. When coupled together, one or more surfaces of the cover 104 and the main body 102 may define the mobile device cavity 110 and the opening 112. For example, one or more interior surfaces of the cover 104 and one or more interior surfaces of the main body 102 may define the mobile device cavity 110 and the opening 112. In this regard, the cavity 110 of device holder 100 may be configured to receive a mobile device via the opening 112, such that a seat occupant may be able to stow the mobile device within the device holder 100 when the mobile device is not in use. As discussed further herein, a seat occupant occupying a cabin attendant seat may be able to access the seat pan mounted device holder 100 pan through the side opening 112 for in-flight use by the seat occupant.

In embodiments, the access port 114 is positioned opposite the opening 112 to allow stuck items to be pushed out of the cavity 110 without the device holder 100 being disassembled. For example, the access port 114 may allow a seat occupant to insert an item (e.g., pen, pencil, stick, screwdriver, or the like) through the access port 114 to push out items contained within the cavity 110.

Figure 2:
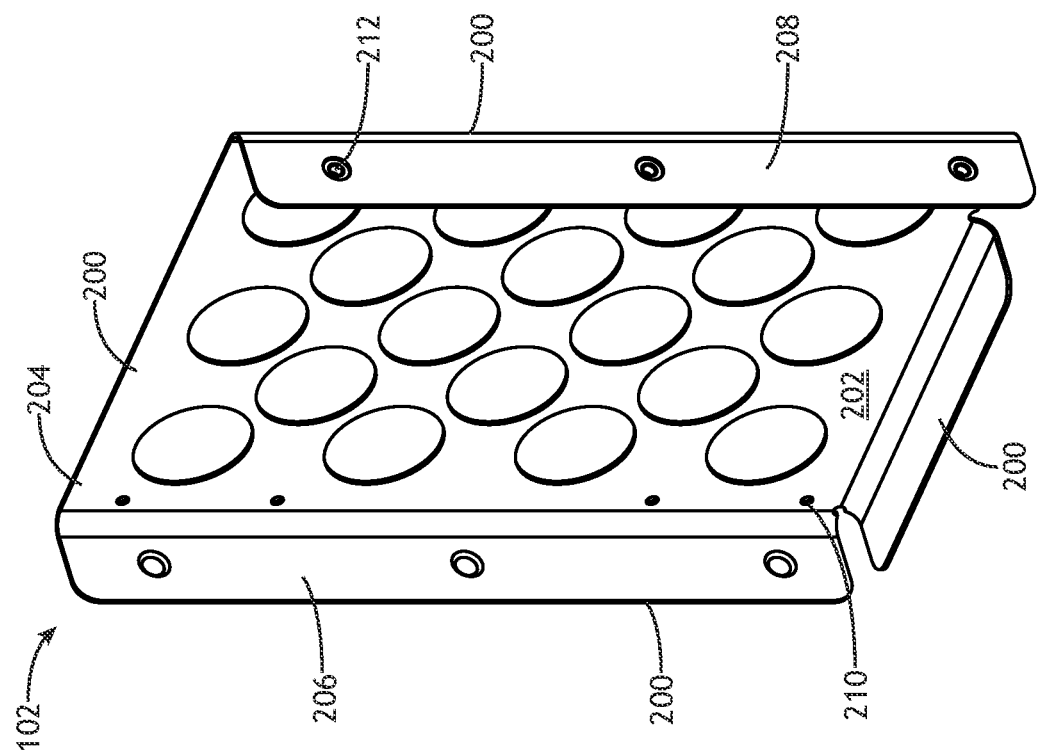
FIG. 2 illustrates a perspective view of a main body of the seat mounted mobile device holder, in accordance with one or more embodiments of the present disclosure.

FIG. 2 illustrates the main body 102 of the device holder 100, in accordance with one or more embodiments of the present disclosure. For purposes of the present disclosure, it is noted that "main body," "body," and variations thereof may be considered equivalent.

In embodiments, the main body 102 includes one or more body walls 200 that define a cavity 202. It is noted that the main body 102 may include up to an N number of body walls 200. For example, the main body 102 may include at least a first body wall 200 (e.g., bottom wall), a second body wall 200 (e.g., rear wall), a third body wall 200 (e.g., a first side wall), and a fourth body wall 200 (e.g., a second side wall).

In embodiments, a body wall of the one or more body walls 200 may include perforated body walls 204. For example, the first body wall 200 (e.g., bottom body wall) may include a perforated body wall 204 (e.g., a body wall including one or more cut outs or perforations). It is noted that the perforations may reduce the weight of the device holder 100.

Referring to FIG. 1B, in embodiments, the one or more body walls 200 may include one or more padded portions. For example, one or more interior surfaces 206 of the one or more body walls 200 may include one or more padded portions to protect the mobile device when contained within the cavity 202 of the main body (and the cavity 110 generally). In one instance, an interior surface of the first side wall may include a padded portion 115. In another instance, an interior surface of the rear wall may include a padded portion 117. In another instance, an interior surface of the second side wall may include a padded portion. In another instance, an interior surface of the bottom body wall (e.g., perforated wall 204) may include one or more padded portions 120.

Although FIG. 1B depicts a specific padding configuration (e.g., number, layout, and the like), the device holder 100 (e.g., main body 102, cover 104, and the like) may include any configuration of padding. The one or more padded portions may be formed of any material suitable for protecting the mobile device. For example, the one or more padded portions may be formed of one or more flame-retardant hook-and-loop padding materials. It is noted that the one or more padded portions may provide scratch and bump protection for the mobile device while stowed in the device holder 100.

In embodiments, the main body 102 is mountable to a seat (e.g., cabin attendant seat 600 shown in FIGS. 6A-6G). For example, a body wall of the one or more body walls 200 may be mountable to a seat via one or more mounting fasteners 210. The device holder 100 may be mounted to the seat via any mounting fasteners or mounting techniques suitable for withstanding up to 16 G of acceleration such as, but not limited to, one or more rivets, one or more adhesives, one or more welding techniques, and the like.

As discussed previously herein, the device holder 100 when mounted to the seat (e.g., seat pan of the cabin attendant seat) may be able to withstand accelerations up to 16 G.

It is noted that the main body 102 may be formed of any material suitable for withstanding up to 16 Gs of accelerations. For example, the main body 102 may be formed of aluminum, titanium, stainless steal, and the like.

Figure 3:
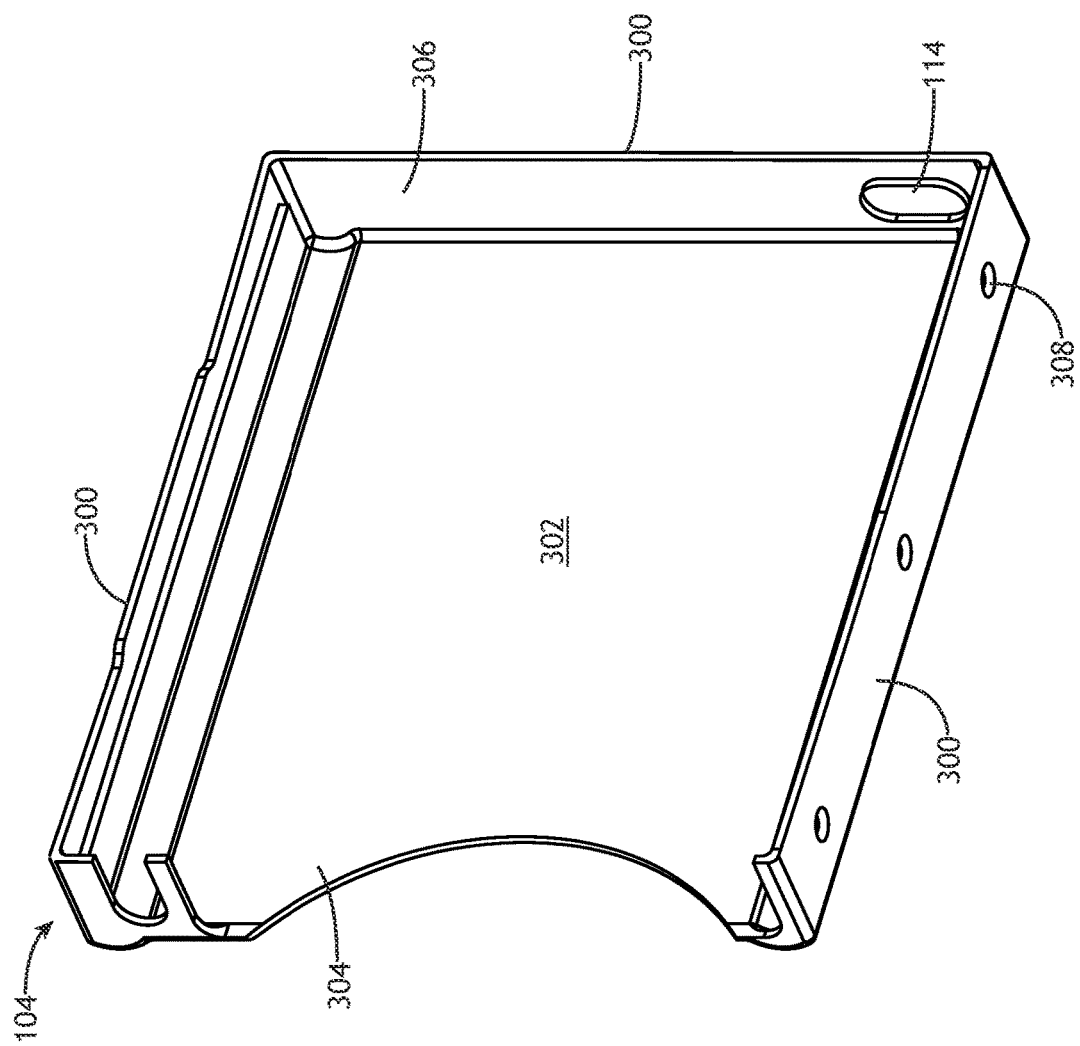
FIG. 3 illustrates a perspective view of a cover of the seat mounted mobile device holder, in accordance with one or more embodiments of the present disclosure.

FIG. 3 illustrates the cover 104 of the device holder 100, in accordance with one or more embodiments of the present disclosure.

In embodiments, the cover 104 may include one or more walls 300 that define a cavity 302. It is noted that the cover 104 may include up to an N number of walls 300. For example, the cover 104 may include at least a first wall 300 (e.g., top wall), a second wall 300 (e.g., rear wall), a third wall 300 (e.g., a first side wall), and a fourth wall 300 (e.g., a second side wall).

In embodiments, the one or more walls 300 of the cover 104 may be dimensioned to fit over the one or more walls 200 of the main body 102. For example, one or more interior surfaces 304 of the one or more walls 300 of the cover 104 may be configured to engage with one or more exterior surfaces 208 of the one or more walls 200 of the main body 102 (e.g., via one or more fasteners, friction caused by interference, or the like).

In this regard, the cover 104 may stay in place on or in the main body 102 until the one or more fasteners are removed (or until a select amount of force is applied (e.g., a select amount of force equal to or greater than a frictional force, or other force applied to the cover 104 on the main body 102, or some combination of forces)).

In embodiments, the cover 104 may be fully removable from the main body 102. For example, the cover 104 may be reversibly coupled to the main body 102 via one or more fasteners. For instance, a first portion of the cover 104 may be reversibly coupled to the main body 102 via one or more screws 116 (as shown in FIGS. 1B-1C) and one or more holes 212, 308. In this regard, a body wall (e.g., side body wall) of the main body 102 may couple to the first portion of the cover 104 via the one or more screws 116 and the one or more holes 212, 308, where the padded portion 115 may at least partially cover a portion of the one or more screws 116 (to prevent the screws from damaging the mobile device when in the cavity 110 of the device holder 100).

In embodiments, the cover 104 may include one or more raised portions 124. For example, the top wall 300 may include a first raised portion proximate to the first side wall. By way of another example, the top wall 300 may include a second raised portion proximate to the second side wall. It is noted that the one or more raised portions may compliment the aesthetics of the seat (e.g., bumps 610 of the cabin attendant seat 600 shown in FIGS. 6A-6G) and provide rigidity to protect the device holder 100 from impact.

Referring to FIG. 1A, the device holder 100 may include one or more placards 126. For example, an exterior surface 306 of the one or more walls 300 of the cover 104 may include one or more placards 126. In one instance, an exterior surface of a top wall of the cover 104 may include a first placard 126 (e.g., a latch must be closed placard). In another instance, an exterior surface of a top wall of the cover 104 may include a second placard 126 (e.g., max weight indicator placard (e.g., 0.6 kg/1.32 lbs.)). It is noted that the one or more placards 126 may be coupled to one or more surfaces of the device holder and may include any message (e.g., safety alert, instructions, or the like), graphic (e.g., branding), symbol, or the like.

It is noted that the cover 104 may be formed of any material. For example, the cover 104 may be formed of thermoformed plastic, one or more metals or metal alloys, one or more composites, and the like.

Figure 4:
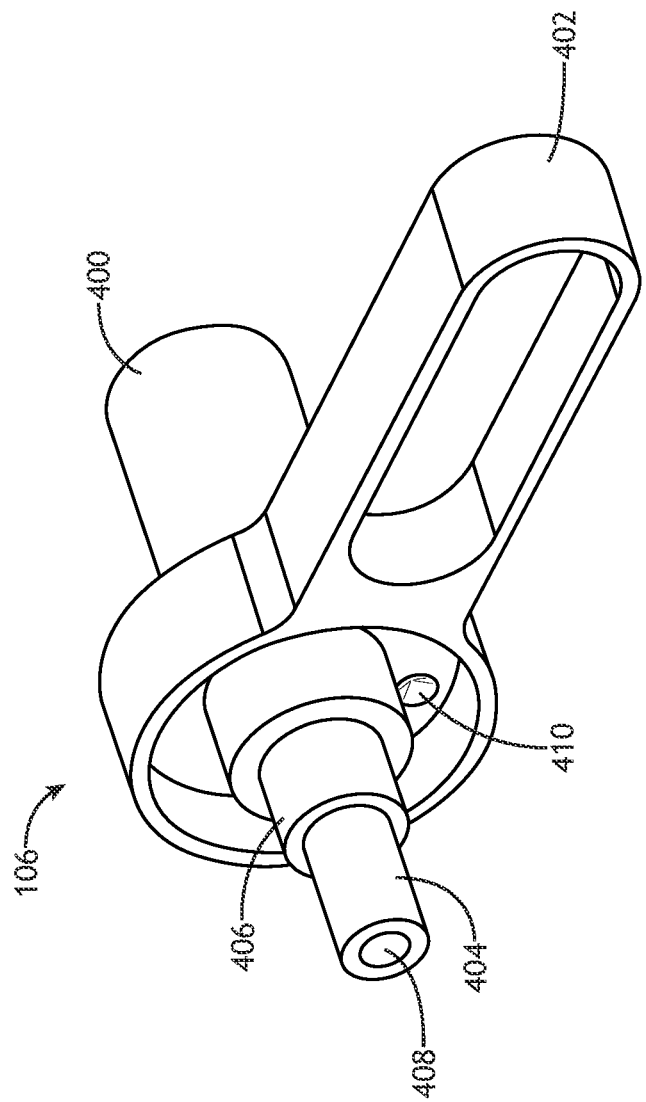
FIG. 4 illustrates a perspective view of a lever assembly of the seat mounted mobile device holder, in accordance with one or more embodiments of the present disclosure.

FIG. 4 illustrates the lever assembly 106 of the device holder 100, in accordance with one or more embodiments of the present disclosure.

In embodiments, the lever assembly 106 is configured to secure the mobile device within the cavity 110 when in the closed position (e.g., secured position). For example, when the one or more lever assembly 106 is in the closed position (e.g., secured position), the lever assembly 106 may be configured to prevent the mobile device from being dislodged from the device holder 100. For purposes of the present disclosure, it is noted that "lever assembly," "assembly 106," and variations thereof may be considered equivalent.

The lever assembly 106 may include a retention lever assembly. The retention lever assembly 106 may include a handle portion 400, a lever portion 402, a lever securing portion 404, a bearing surface 406 for the levers rotation, and one or more detent holes 410.

The lever portion 402 may configured to rotate between 0 and 180 degrees between the closed position and the open position (and vice versa) via an axis through the handle portion 400. For example, the lever assembly 106 may include the one or more detent holes 410 positioned proximate to the lever portion 402 and configured to facilitate positive locking at 0 and 180 degrees. For instance, the lever portion 402 may include a two-position lever latch with positive locking at 0 and 180 degrees, such that the lever portion 402 may rotate about the axis between the open position and closed position (and vice versa). The handle portion 400 may aid a seat occupant in rotating the lever portion 402 between the respective positions.

The securing portion 404 may include a mating portion (e.g., threaded portion) 408 configured to mate with one or more fasteners that retain and compress the spring (not shown). The securing portion 404 may be configured to retain the compression spring (not shown).

Although embodiments of the present disclosure are directed to a retention lever assembly 106, it is noted that the device holder 100 may include any type of securing member assembly suitable for securing the mobile device within the cavity 110 of the device holder 100. As previously discussed herein, the retention lever assembly 106 may be configured to withstand accelerations up to 4 Gs, such that the mobile device is not inadvertently dislodged in-flight.

Referring to FIGS. 1A-1B, the retention lever assembly 106 may include one or more status indicators 128 configured to indicate whether the lever assembly 106 is in the open position (e.g., unsecured position) or the closed position (e.g., secured position). For example, the lever portion 402 of the lever assembly 106 may include an indicator configured to indicate that the lever assembly 106 is in the closed position. For instance, the indicator may be a colored indicator (e.g., green indicator) to indicate that the mobile device is secured within the cavity via the lever portion 402 of the lever assembly 106. By way of another example, the lever portion 402 of the lever assembly 106 may include an indicator configured to indicate that the lever assembly 106 is in the unsecured position. For instance, the indicator may be a colored indicator (e.g., red indicator) to indicate that the mobile device is not secured within the cavity via the lever portion 402 of the lever assembly 106.

Although FIG. 1A depicts a status indicator 128 on a first side of the lever 402 of the lever assembly 106, it is noted herein that the lever assembly 106 may include a status indicator 128 on an opposite side of the lever portion 402. For example, the first status indicator 128 on the first side of the lever 402 may be a first color (e.g., green) and the second status indicator 128 on the opposite side of the lever portion 402 may be a second color (e.g., red). As such, the green indicator may indicate that the lever 402 is in the secured position and the red indicator may indicate that the lever 402 is in the unsecured position, such that a user may easily visualize whether the device is secured within the cavity of the device holder 100.

It is noted that the one or more status indicators 128 may include any type of status indicator. For example, the one or more status indicators 128 may include one or more colored indicators (e.g., red, green, or the like). By way of another example, the one or more status indicators 128 may include one or more word indicators (e.g., secured, unsecured, or the like). By way of another example, the one or more status indicators 128 may include one or more symbol or graphic indicators. By way of another example, the one or more status indicators 128 may include one or more light-emitting diode (LED) indicators. Further, it is noted that the one or more status indicators 128 may be coupled to any location of the device holder. For example, the one or more status indicators may be arranged on the main body 102 and/or the cover 104.

FIGS. 5A-5B illustrate the structural member 108 of the device holder 100, in accordance with one or more embodiments of the present disclosure.

In embodiments, the structural member 108 includes one or more walls 500 that define a cavity 502. It is noted that the structural member 108 may include up to an N number of walls 500. For example, the structural member 108 may include at least a first wall 500 (e.g., front wall), a second wall 500 (e.g., rear wall), a third wall 500 (e.g., a first side wall), and a fourth wall 500 (e.g., a second side wall). By way of another example, the structural member 108 may include at least a first wall 500 (e.g., front wall), a second wall 500 (e.g., rear wall), and a third wall 500 (e.g., a side wall), where the main body 102 and the structural member 108 share a wall opposite the side wall.

In embodiments, the structural member 108 is configured to couple to a portion of the main body 102. For example, an exterior surface of a wall 500 of the structural member 108 may be configured to couple to an exterior surface of the wall 200 of the main body 102 via one or more fasteners and one or more holes 506.

The structural member 108 may provide a mounting point for the main body 102. For example, a wall (e.g., side wall) of the structural member 108 may include one or more mounting holes 506 (e.g., threaded mounting holes) for mounting the main body 102 to the structural member 108. It is noted that the structural member 108 may further add substantial impact protection.

The structural member 108 may provide a rotation point for the lever assembly 106. For example, a wall (e.g., front wall) of the structural member 108 may include a hole 504 for receiving a portion of the securing portion (including the spring). The one or more detent holes 410 may receive one or more detent pins (not shown). Referring to FIGS. 5A-5B, the support member 108 may include one or more holes 508 configured to retain the detent pin that drops in and out of the one or more detent holes 410 of the lever assembly 108.

In embodiments, the cover 104 is fully removable from the structural member 108 (and the main body 102). For example, the cover 104 may be reversibly coupled to the structural member 108 via one or more fasteners. For instance, a second portion (opposite the first portion) of the cover 104 may be reversibly coupled to the structural member 108 via one more hook-and-loop fasteners. In this regard, an exterior surface of the wall 500 of the structural member 108 may include one or more hook-and-loop fasteners configured to reversibly couple to an interior surface of the wall 300 of one or more complementary hook-and-loop fasteners of the cover 104. As such, the cover 104 may be removed from the main body 102 and the structural member 108 via the screws/hook-and-loop fasteners with minimal tools, while minimizing visible fasteners (e.g., screw heads).

Although FIG. 1B depicts the structural member 108 and the main body 102 as separate components, it is noted that the structural member 108 and the main body 102 may be a single component. For example, the main body 102 may provide a mounting point for the lever assembly.

FIGS. 6A-6G illustrate a cabin attendant seat 600 including the device holder 100, in accordance with one or more embodiments of the present disclosure. It is noted herein a "cabin attendant" may be considered any crew member (e.g., flight attendant, pilot, co-pilot, or the like) who may have access and/or need to use a cabin attendant seat (e.g., during a TTL-stage of flight, turbulence, emergencies, or the like). In addition, it is noted that "cabin attendant seat", "flight attendant seat", "aircraft seat", and variations thereof may be considered equivalent, for purposes of the present disclosure.

The cabin attendant seat 600 may be used during a taxi, takeoff, or landing (TTL) stages of flight (though it is noted herein the cabin attendant seat 600 is not limited to use during the select stages of flight as the TTL position, but also may be used at any point during the flight).

Figure 6A:
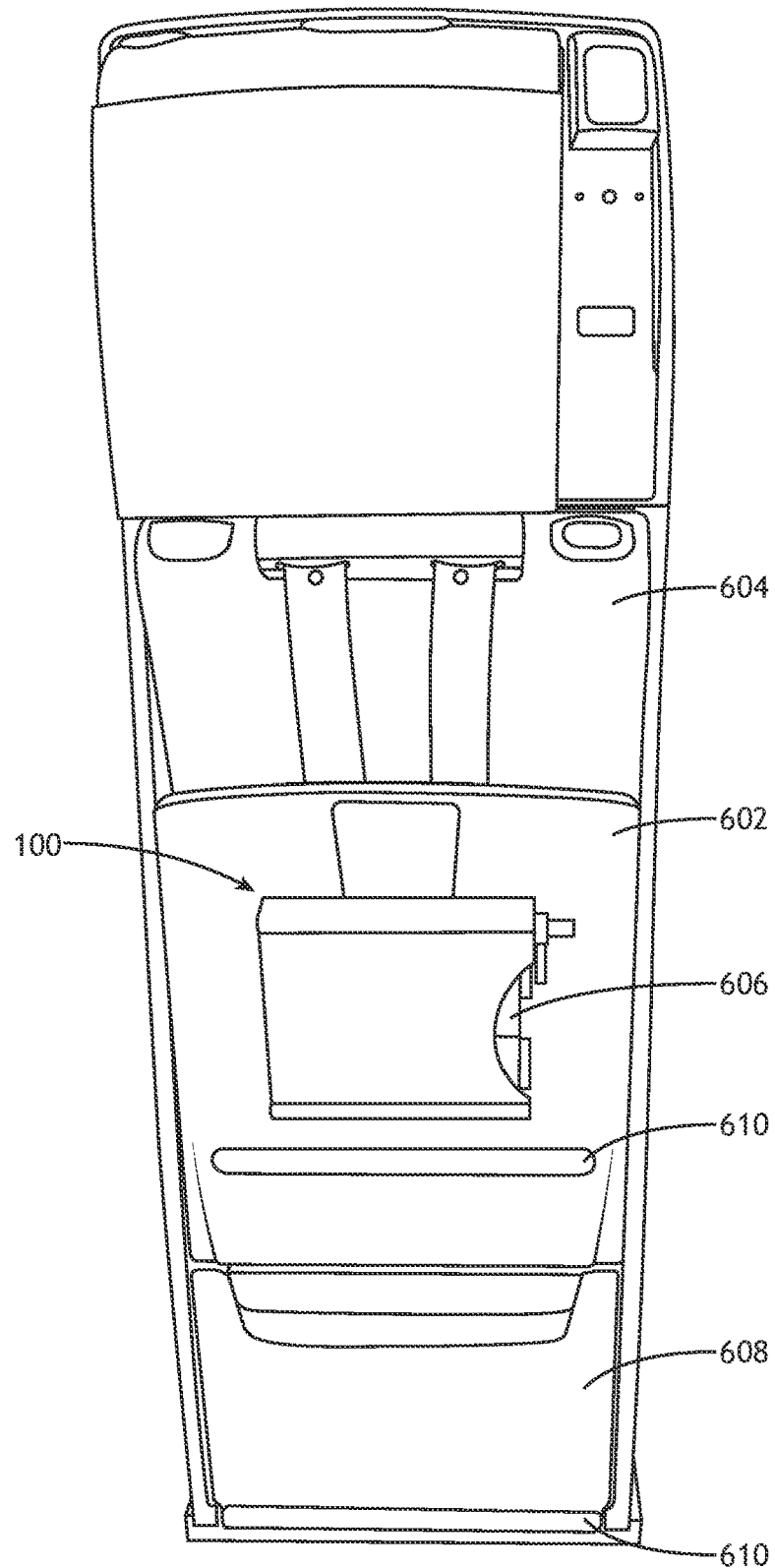
FIG. 6A illustrates a perspective view of a cabin attendant seat including the seat pan mounted mobile device holder and a mobile device, in accordance with one or more embodiments of the disclosure.
Figure 6B:
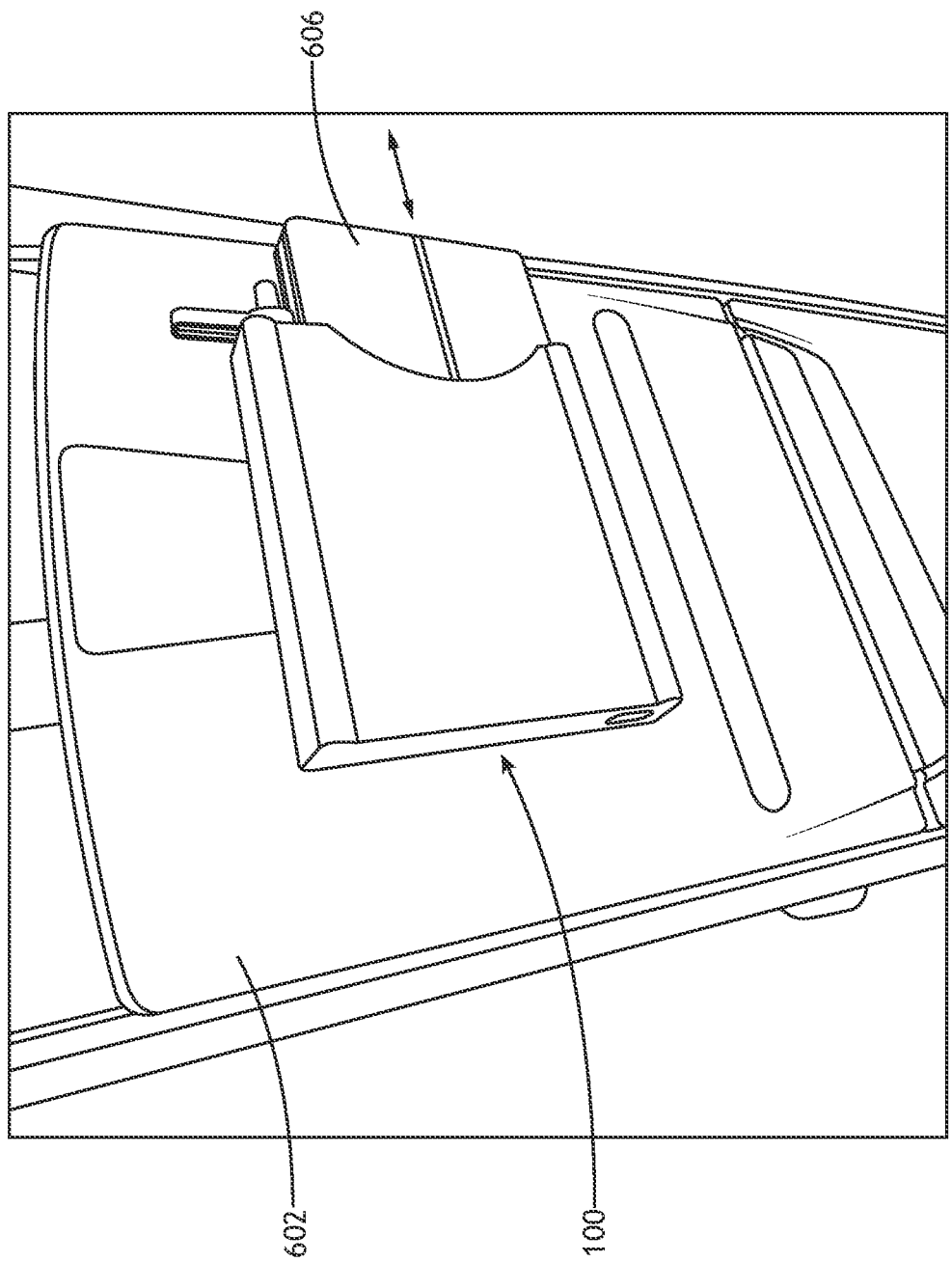
FIG. 6B illustrates a perspective view of a cabin attendant seat including the seat pan mounted mobile device holder and a mobile device, in accordance with one or more embodiments of the disclosure.
Figure 6C:
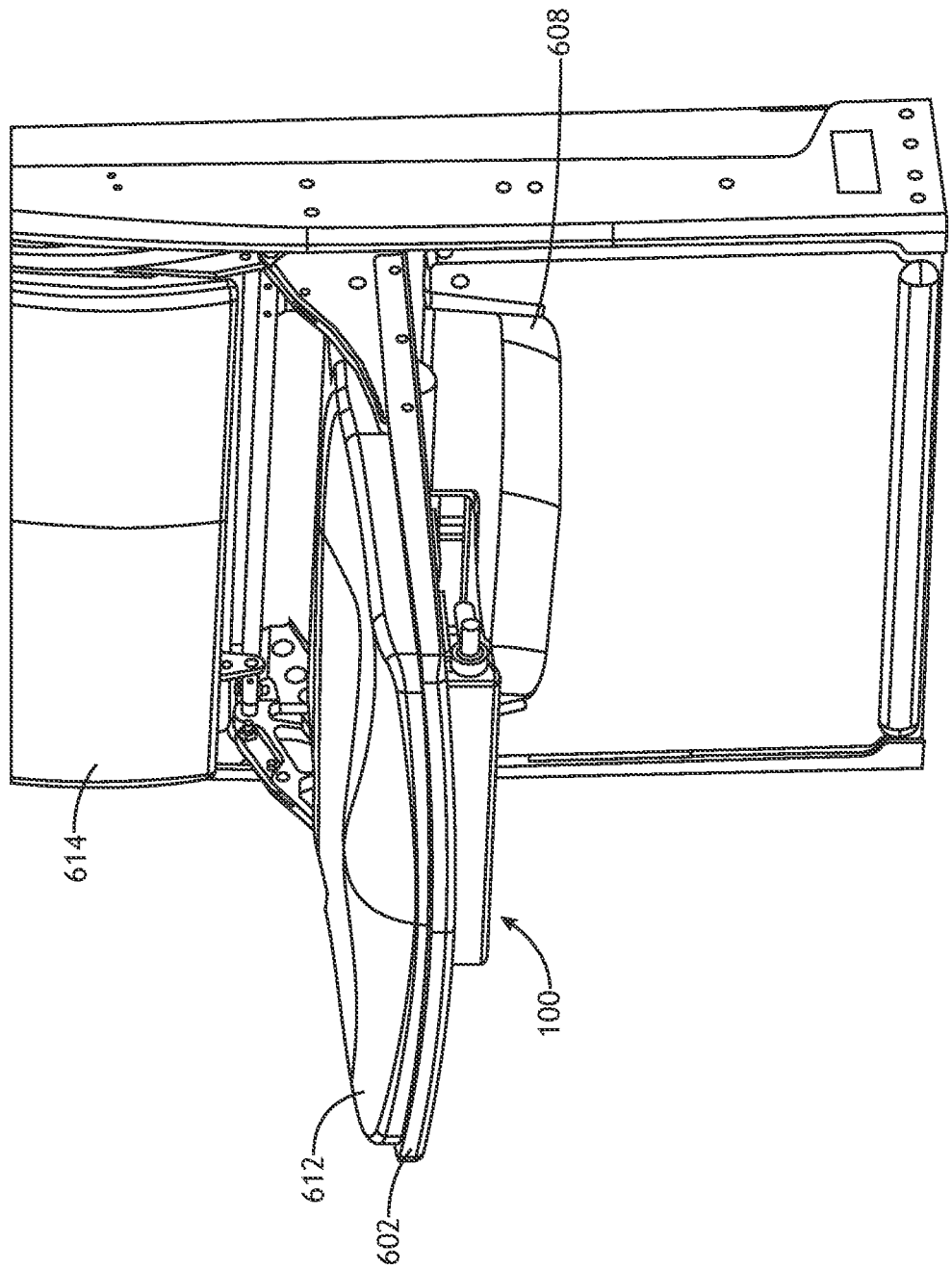
FIG. 6C illustrates a perspective view of a cabin attendant seat including the seat pan mounted mobile device holder, in accordance with one or more embodiments of the disclosure.
Figure 6D:
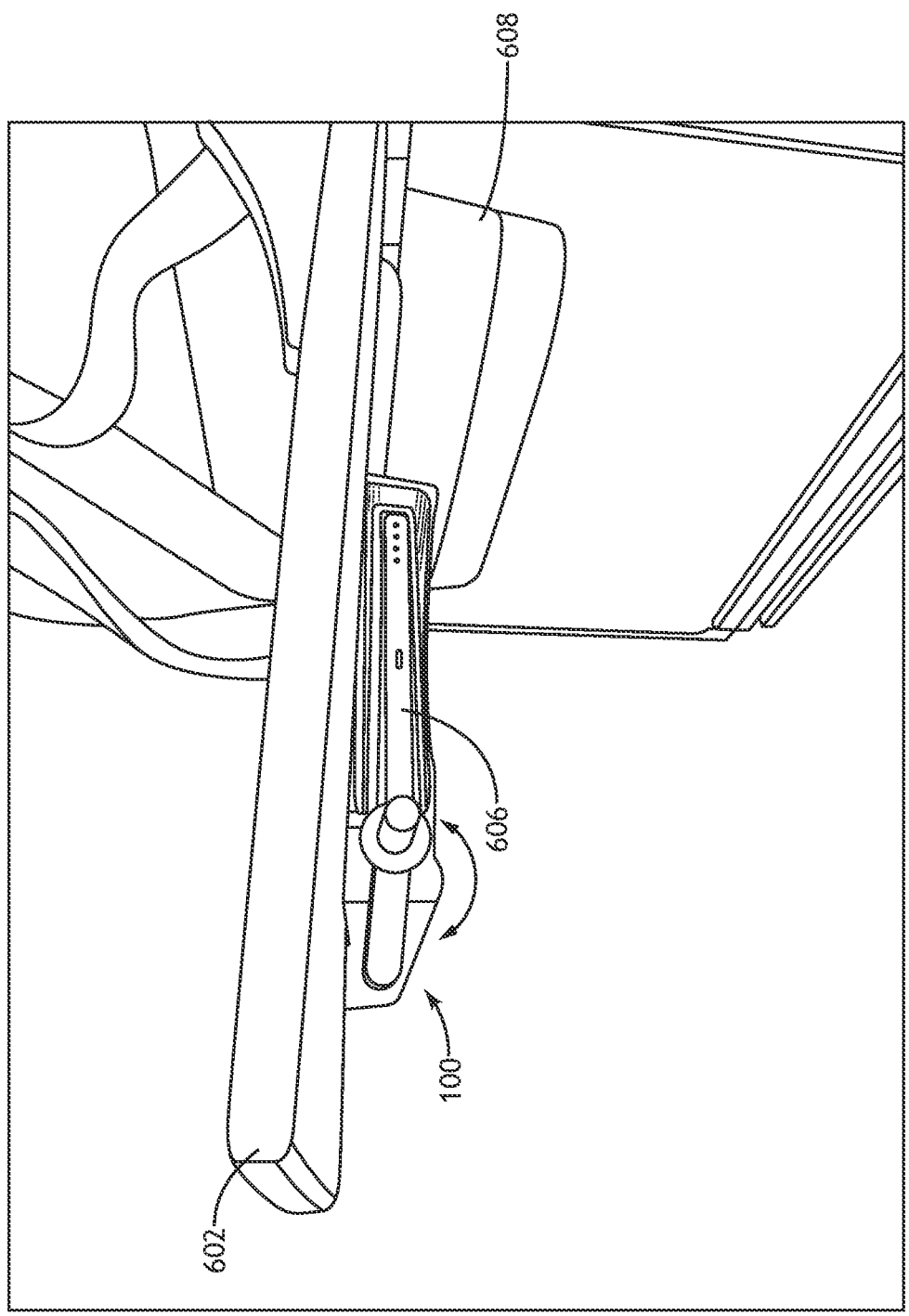
FIG. 6D illustrates a side perspective view of a cabin attendant seat including the seat pan mounted mobile device holder and a mobile device, in accordance with one or more embodiments of the disclosure.
Figure 6E:
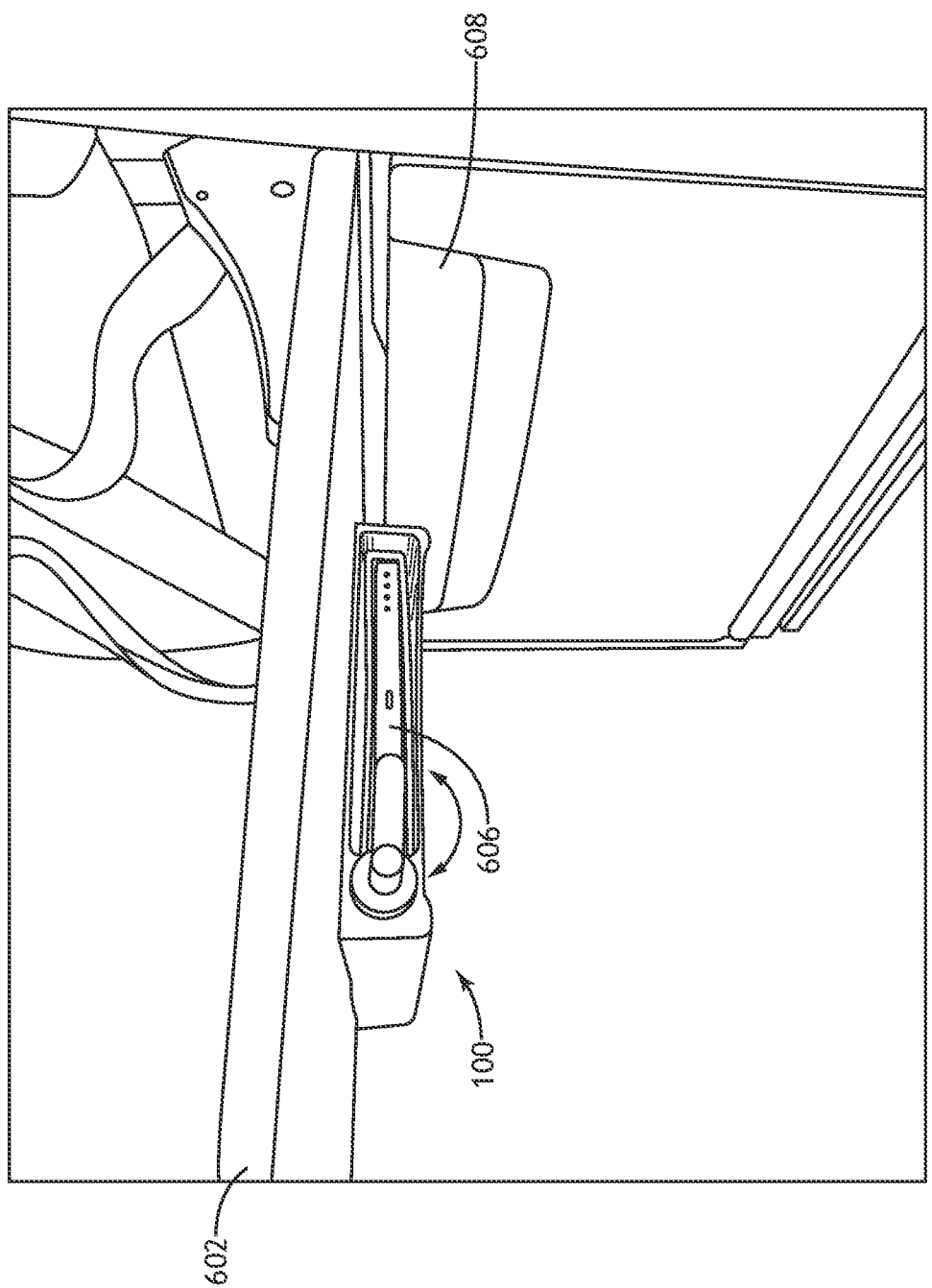
FIG. 6E illustrates a side perspective view of a cabin attendant seat including the seat pan mounted mobile device holder and a mobile device, in accordance with one or more embodiments of the disclosure.
Figure 6F:
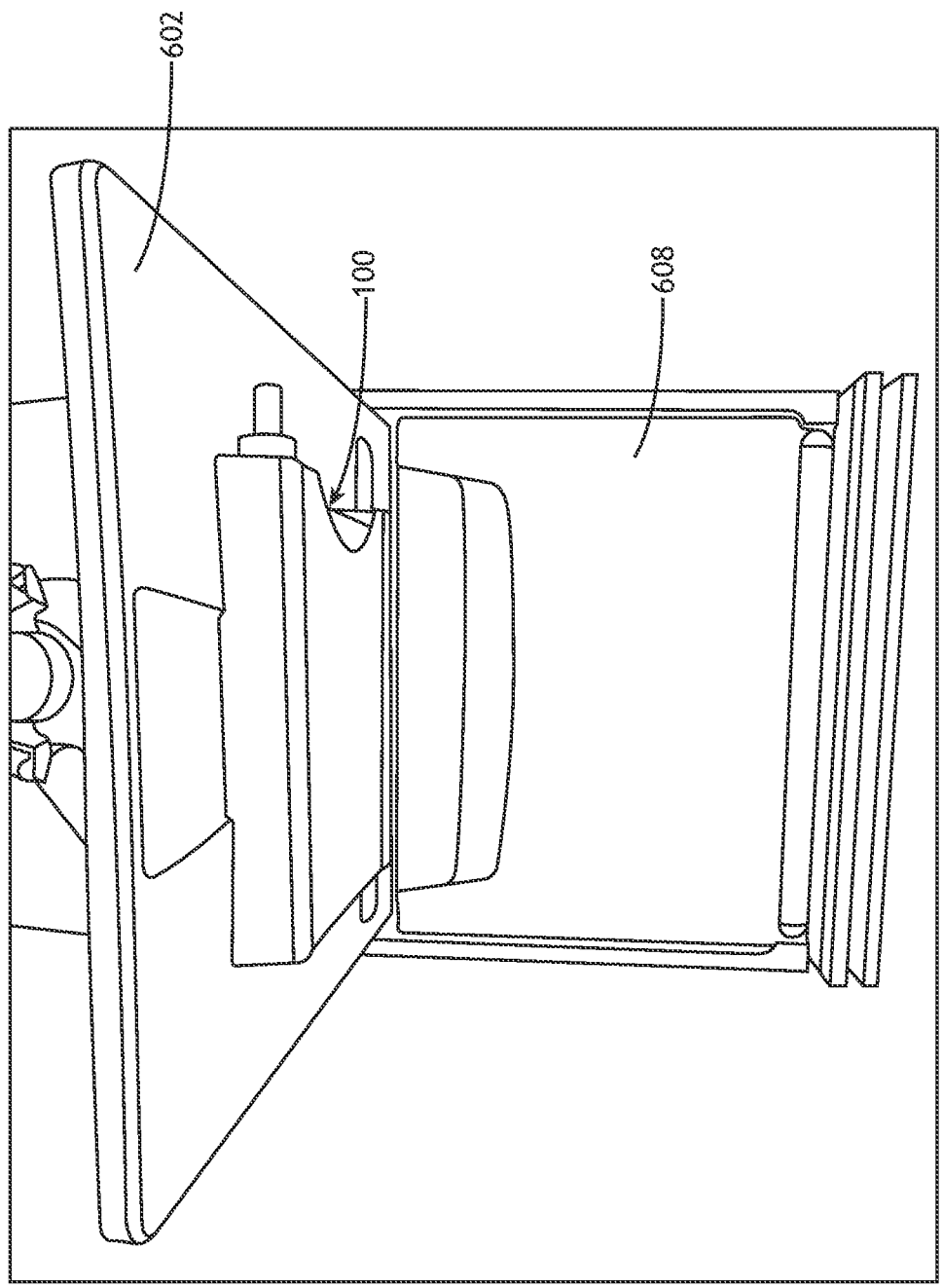
FIG. 6F illustrates a front perspective view of a cabin attendant seat including the seat pan mounted mobile device holder and a mobile device, in accordance with one or more embodiments of the disclosure.
Figure 6G:
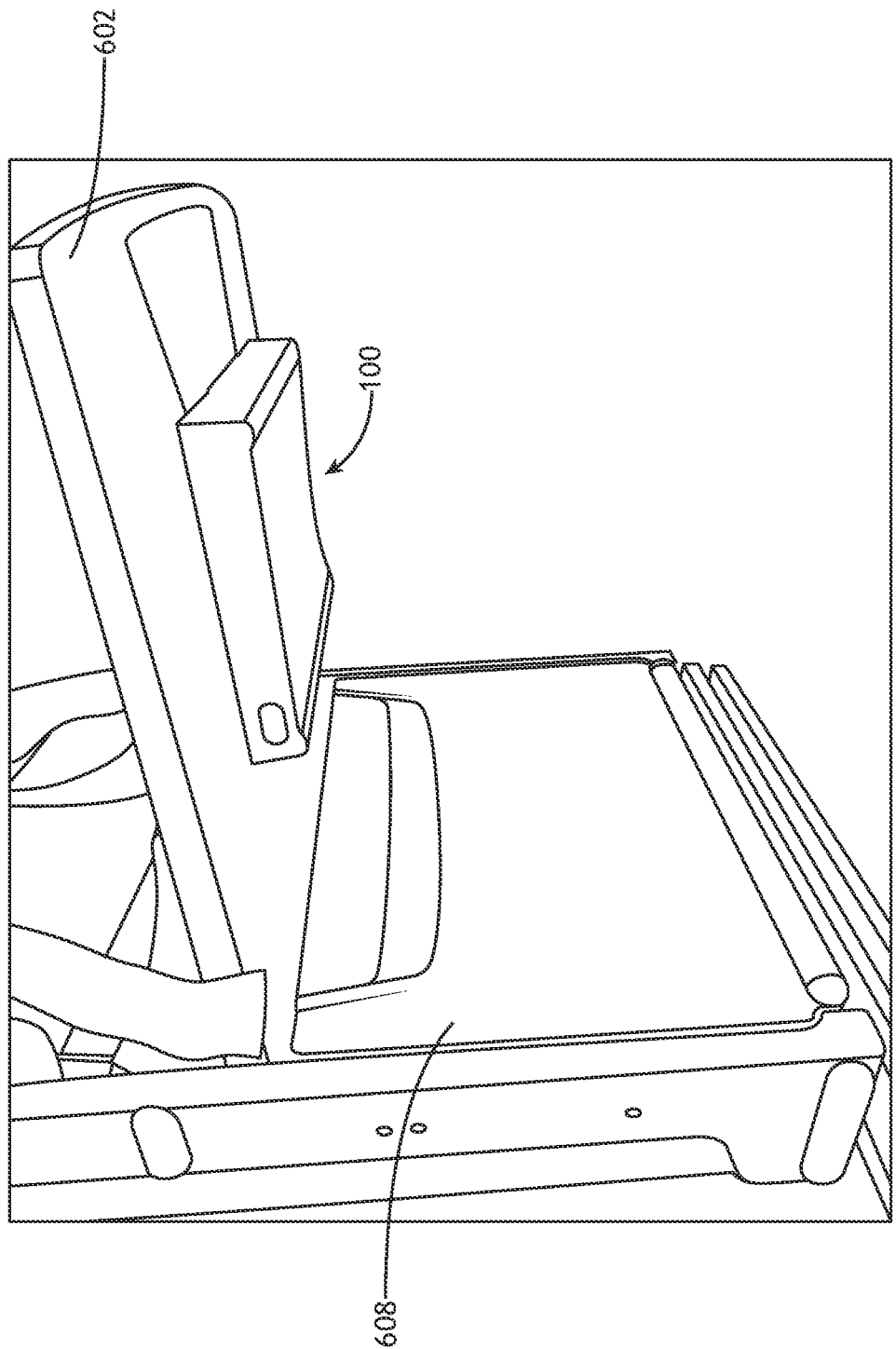
FIG. 6G illustrates a side perspective view of a cabin attendant seat including the seat pan mounted mobile device holder and a mobile device, in accordance with one or more embodiments of the disclosure.

The cabin attendant seat 600 may include a seat pan 602 and a seatback 604. It is noted herein the seat pan 602 and/or the seatback 604 may include one or more of a cushion, a diaphragm, a dress cover, or some combination of a cushion, a diaphragm, and a dress cover. For example, as shown in FIG. 6C, the seat pan 602 may include a seat pan cushion 612 and the seatback 604 may include a seatback cushion 614.

The seat pan 602 may be vertical or may be set at an angle relative to the floor of the aircraft cabin when the cabin attendant seat 600 is in a deployed seat position. The seatback 604 may be vertical or may be set at an angle relative to the floor of the aircraft cabin when the cabin attendant seat 600 is in a deployed seat position.

As previously discussed herein, in embodiments, the device holder 100 is coupled to (or mounted on) the cabin attendant seat 600. For example, the device holder 100 may be coupled to (or mounted on) the seat pan 602 of the cabin attendant seat 600. In this regard, a seat occupant may be able to stow a mobile device 606 within the cavity 110 of the device holder 100 when the mobile device 606 is not in use.

In embodiments, the device holder 100 may be coupled to (or mounted on) a surface of the aircraft cabin. For example, the device holder 100 may be coupled to (or mounted on) a wall of an aircraft cabin.

The cavity 110 of the device holder 100 may be configured to receive any type of mobile device 606. For example, the cavity 110 may be configured to receive a tablet. By way of another example, the cavity 110 may be configured to receive a phone. By way of another example, the cavity 110 may be configured to receive a phablet or other electronic device. In some embodiments, the cavity 110 of the device holder 100 may include an insert configured to reduce the cavity size of the cavity 110 such that the cavity 110 is configured to receive a variety of mobile devices.

The cabin attendant seat 600 may further include one or more storage compartments 608. The one or more storage compartments 608 may include a door. It is noted, however, that the one or more storage compartments 608 may be similar to a shelving unit without doors. In addition, it is noted herein that the one or more storage compartments 608 may include one or more racks. The one or more storage compartments 608 may be accessible when the seat pan 602 is in the deployed or stowed position. It is noted that the sleek design of the device holder 100 allows the storage compartment 608 to be accessed when the seat pan 602 is in the deployed position.

The one or more storage compartments 608 may be a storage compartment configured to receive cabin attendant items (e.g., cabin attendant carry-on luggage, or the like). The one or more storage compartments 608 may include one or more safety devices (e.g., air masks, personal floatation devices, or the like).

The one or more storage compartments 608 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like.

The one or more storage compartments 608 may include one or more electronic connections for one or more cabin attendant amenities such as, but not limited to, one or more charging ports, one or more charging cables, or the like. A storage compartment 608 may include one or more electronic connections in communication with one or more components of the aircraft cabin such as, but not limited to, one or more display device connection ports, one or more display device connection cables, one or more audio output jacks (e.g., headphone jacks), one or more audio input jacks, or the like.

Although embodiments of the disclosure are directed to an aviation environment such as an aircraft cabin, it is noted herein the seat pan mounted mobile device holder 100 is not limited to the aviation environment and/or the aircraft components within the aviation environment. For example, the device holder 100 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the device holder 100 may be configured for commercial or industrial use in either a home or a business. Therefore, the above description should not be interpreted as a limitation on the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A cabin attendant seat, the cabin attendant seat comprising:
   a seat pan;
   a seatback; and
   a device holder coupled to a portion of the seat pan, the device holder comprising:
      a main body including a plurality of main body walls that define a main body cavity, a first main body wall of the plurality of main body walls configured to couple to the portion of the seat pan;
a cover including a plurality of cover walls that define a cover cavity,
the main body cavity and the cover cavity forming a device holder cavity configured to stow a mobile device when the cover is coupled to the main body;
an opening positioned proximate to the device holder cavity, the opening configured to receive a portion of the mobile device;
a structural member coupled to an external surface of a second main body wall of the plurality of main body walls; and
a device securing assembly coupled to one of the main body, the cover, or the structural member, the device securing assembly configured to rotate between at least a first position and a second position, when in the first position the device securing assembly configured to secure the mobile device within the device holder cavity, when in the second position the mobile device configured to be removed from the device holder cavity via the opening.

2. The seat of claim 1, wherein the device securing assembly includes a retention lever assembly including a handle portion, a lever portion, and a securing portion.

3. The seat of claim 2, wherein the retention lever assembly is coupled to the structural member via the securing portion of the retention lever assembly.

4. The seat of claim 2, wherein the lever portion includes one or more status indicators.

5. The seat of claim 3, wherein the retention lever assembly further comprises:
one or more detent holes configured to facilitate positive locking between at least the first position and the second position.

6. The seat of claim 1, wherein the main body cavity comprises:
one or more padded portions, the one or more padded portions coupled to at least one main body wall of the plurality of main body walls,
the one or more padded portions configured to protect the mobile device when stowed in the device holder cavity.

7. The seat of claim 1, wherein the device holder further comprises:
one or more access ports.

8. The seat of claim 1, wherein a cover wall of the plurality of cover walls comprises:
one or more raised portions.

9. The seat of claim 1, wherein the first main body wall of the plurality of main body walls comprises:
one or more perforations.

10. The seat of claim 1, wherein the device holder further comprises:
one or more placards coupled to one or more exterior surfaces of the plurality of cover walls of the cover.

11. The seat of claim 10, wherein the one or more placards include a maximum weight placard.

12. The seat of claim 10, wherein the one or more placards include a device securing assembly instruction placard.

13. The seat of claim 1, wherein the cover is formed of a thermoformed plastic.

14. The seat of claim 1, wherein the plurality of cover walls of the cover are dimensioned to fit over the plurality of main body walls of the main body, one or more interior surfaces of the plurality of cover walls configured to engage with one or exterior surfaces of the plurality of main body walls of the main body.

\* \* \* \* \*